United States Patent
Ross

[11] 3,846,517
[45] Nov. 5, 1974

[54] STABILIZATION SYSTEM FOR A FLOATING WATER AERATOR

[75] Inventor: George Ross, Downers Grove, Ill.

[73] Assignee: Clow Corporation, Oak Brook, Calif.

[22] Filed: July 26, 1972

[21] Appl. No.: 275,258

[52] U.S. Cl.................... 261/91, 210/242, 261/120
[51] Int. Cl............................................. B01f 03/04
[58] Field of Search .......... 261/91, 120, DIG. 5, 71; 210/242; 114/230; 9/8 R; 61/46.5

[56] References Cited
UNITED STATES PATENTS

| | | | |
|---|---|---|---|
| 3,218,042 | 11/1965 | Ciabattari et al. | 261/91 X |
| 3,235,877 | 2/1966 | Grob | 261/91 X |
| 3,320,160 | 5/1967 | Welles, Jr. et al. | 261/91 X |
| 3,416,729 | 12/1968 | Ravitts et al. | 261/91 X |
| 3,462,132 | 8/1969 | Kaelin | 261/87 |
| 3,521,864 | 7/1970 | Welles, Jr. | 261/91 X |
| 3,624,701 | 11/1971 | Kingsley | 210/242 X |
| 3,702,657 | 11/1972 | Cunningham et al. | 210/242 |

OTHER PUBLICATIONS
Ashbrook Corp., Houston, Texas 77036, Surfators, Aug. 4, 1967.

Primary Examiner—Tim R. Miles
Assistant Examiner—Richard L. Chiesa
Attorney, Agent, or Firm—Fitch, Even, Tabin & Luedeka

[57] ABSTRACT

A stabilization system for a floating water aerator which utilizes a plurality of pairs of mooring and guy lines. The stability provided allows freedom in design with respect to aerator drives and floats.

12 Claims, 3 Drawing Figures

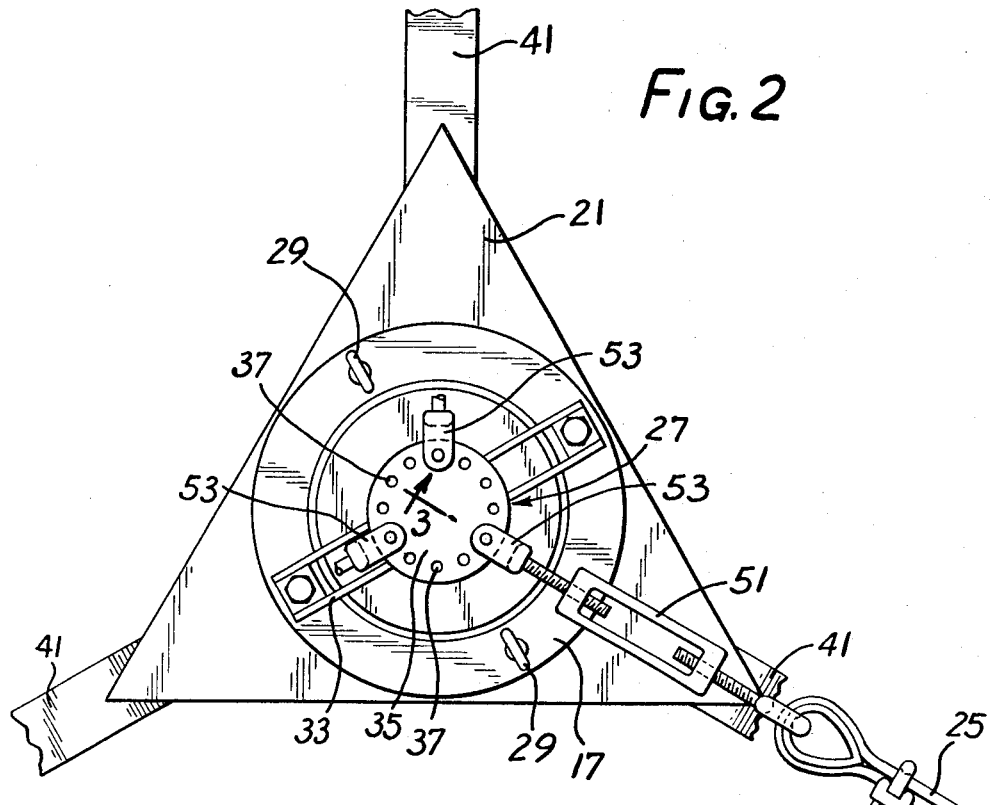
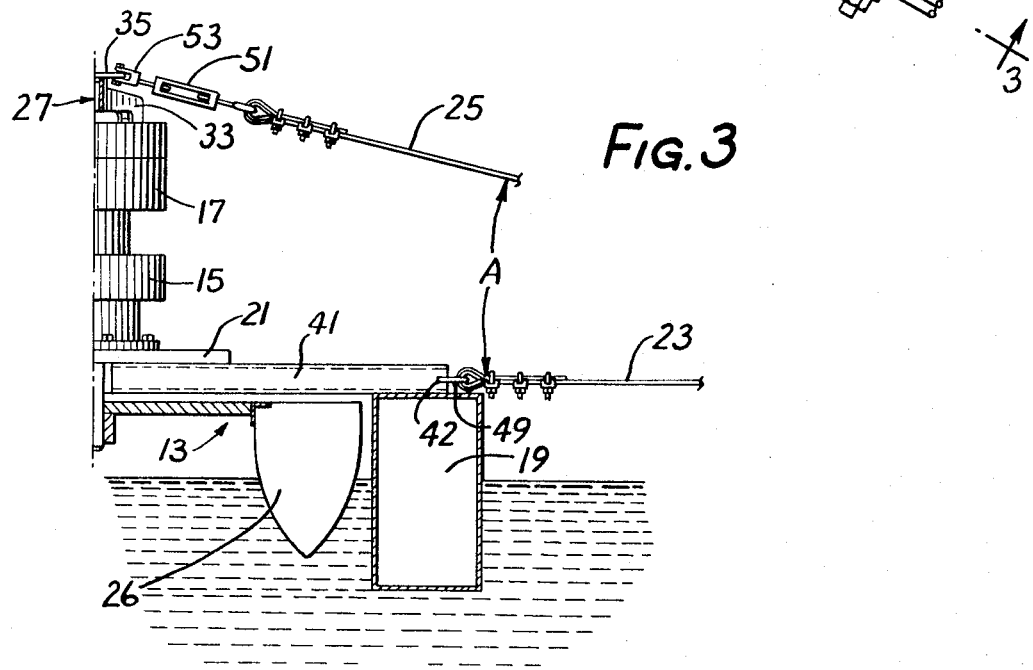

STABILIZATION SYSTEM FOR A FLOATING WATER AERATOR

This invention relates to floating aeration systems, and more particularly to systems for stabilizing floating water aerators.

Water aerators are special purpose pumps which aid in purifying water by mixing air with the water. Many of these aerators have motor driven, rotatable impellers which are floated in a body of water. The impellers are caused to violently throw the water into the air in the form of droplets thereby creating a large amount of surface area for oxygen diffusion and exposing the bacteria within the water to the oxygen within the air. This process is called oxygen enrichment of the water and allows the bacteria within the water to be more efficiently utilized to purify the water.

Such floating aerators are commonly moored to prevent them from drifting away from the desired location where the aerator is to operate. Usually the mooring lines extend from the float of the aerator to a rigid shore anchor. These mooring lines also serve the necessary function of keeping the aerator rotatably stable. If the aerator were not attached or moored in some fashion, the torque created by an impeller rotating about a vertical axis in the water might cause the aerator itself to spin in the water.

Aerators which have their drive units mounted above the water are most frequently top-heavy as a result of having their center of gravity located above the water line. The dynamic forces created by a rotating impeller accentuates this instability, and such aerators might possess erratic movement patterns which could interfere with the effective operation of the aerator. Oftentimes the erratic motions of the aerator, perhaps coupled with a wind condition, are sufficient to cause an aerator to capsize. This is especially true in winter when water spray collects as ice on the upper portion of the aerator causing the aerator to be even more top-heavy and unstable.

Because such uncontrolled movements of the aerator can result in damage to the equipment as well as severly detracting from the efficiency of the aerator, it is advantageous to stabilize the aerator. By lowering the motor and the gear box below the water line, the aerator is made more stable. However, such an aerator construction is more expensive and is extremely difficult to service, oftentimes requiring removal of the aerator from the water to repair it.

It is the object of this invention to provide a stabilized floating aerator.

It is another object of the present invention to provide an improved system of attachment for a floating aerator which will result in the aerator being stabilized.

It is still another object of the present invention to provide a system of stabilization for a floating aerator which allows greater freedom of design with respect to either or both the aerator drives and its floats.

These and other objects and advantages of the invention will become apparent upon reference to the following description and drawings of which:

FIG. 2 is an enlarged top view of the center portion of the aerator of FIG. 1; and FIG. 3 is a fragmentary sectional view taken generally along the line 3—3 of FIG. 2.

Figure 1:
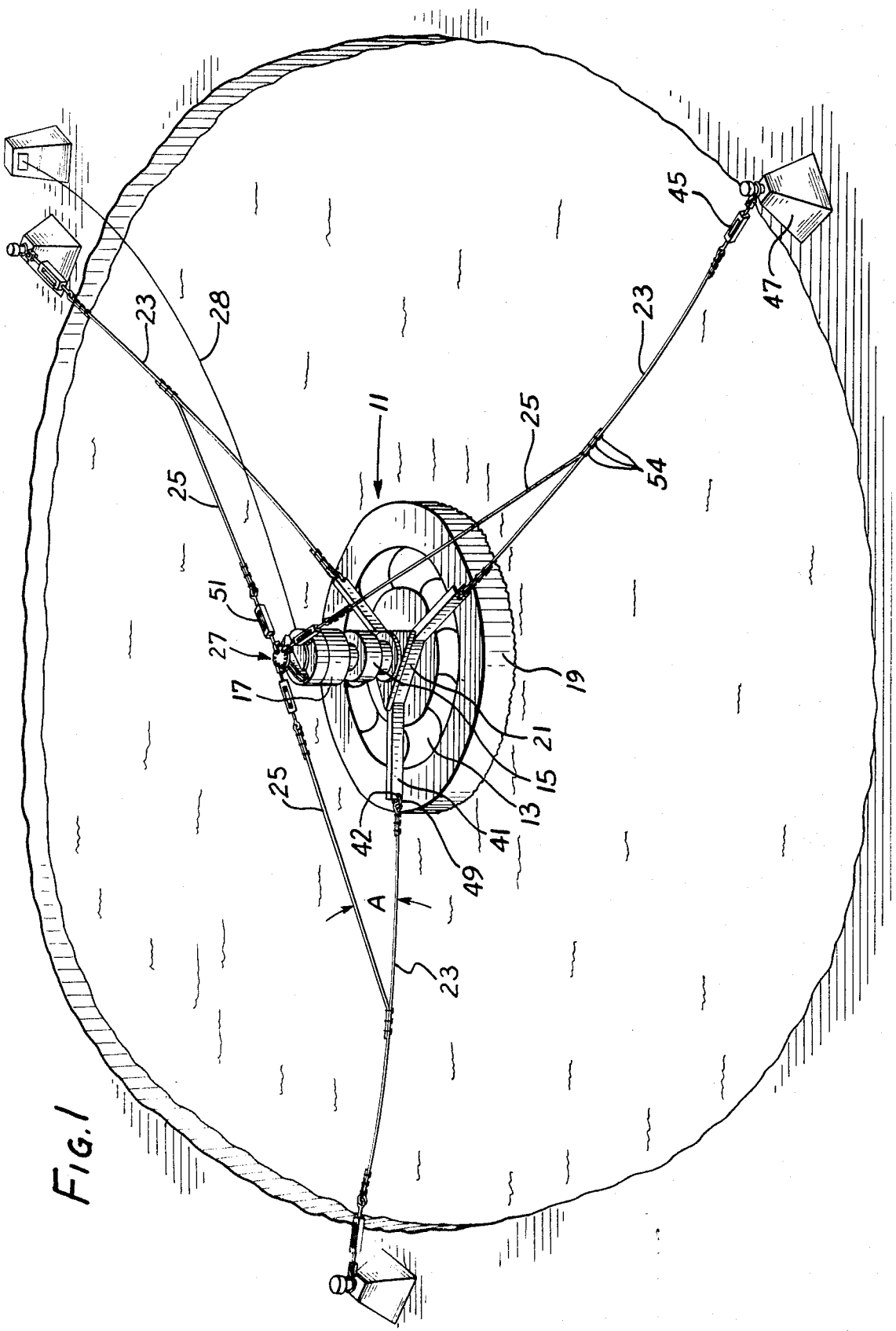
FIG. 1 is a perspective view of a stabilized aerator in accordance with the present invention which is moored in a body of water.

A floating aerator 11 is depicted in FIG. 1 in its stabilized moored condition. Such an aerator 11 very generally comprises an impeller 13, a drive train 15, an electric motor 17, a float or flotation collar 19 and a supporting frame 21. Mooring lines 23 and guy lines 25 and their interconnection and connection to the aerator provide the stabilization system.

More particularly, the impeller 13 is located at least partially below the water line and includes a plurality of blades 26 mounted for horizontal rotation about a vertical shaft or axis. The impeller 13 is connected by the drive train 15 to the motor 17 located above the water line. The motor 17 usually is an electric motor which is connected to a shore power source by a waterproof electric cord 28, which may be strung generally along one of the mooring lines 23.

Bolted to the top of the motor 17 is a guy mount 27. The guy mount 27 is positioned atop the motor so as to not obstruct a pair of lifting shackles 29 which are used to lift the aerator into and out of the water. The guy mount 27 comprises a bracket 33 to which is welded an overlying mounting plate 35. The bracket 33 is a rigid metal bipod that is bolted to the motor 17 and that positions the mounting plate 35 a predetermined vertical distance above the top of the motor 17. The guy mount bracket 33 may be altered to be accommodated on various aerator motors, the particular bipod embodiment being only illustrative. The mounting plate 35 is a flat, rigid plate, circular in plan, having a plurality of clevis mounting holes 37 uniformly spaced about its circumference.

The various components of the aerator 11 are supported on the float 19 by the frame 21. The illustrated frame 21 includes three radially extending arms 41, spaced a uniform angular distance apart and having mooring line mounting holes 42 at their free ends. The flotation collar 19 is fixed in position below the arms 41 and extends peripherally of the impeller 13. The flotation collar 19 provides sufficient buoyancy to support the aerator impeller in the desired vertical relationship to the water line. In alternate embodiments it may be desirable to provide a frame 21 having four or more arms 41, however further discussion will refer to an embodiment having three arms 41.

In the past, certain aerators have depended on an excess buoyancy of the flotation collar to keep the aerator upright and have employed dynamically balanced components, that is, symmetrical motors, gearing mechanisms and the like to minimize the instability of that portion of the aerator above the water line. In accordance with the stabilization system to be hereinafter described, neither balanced components nor excessively buoyant flotation collars are necessary.

The illustrated stabilization system includes three mooring lines 23 and three guy lines 25. Each mooring line 23 includes a turnbuckle 45, and the mooring line is conveniently attached to a shore anchor 47 by that turnbuckle. The mooring line 23 is preferably a wire rope, and the shore end of the mooring line 23 is suitably attached to the turnbuckle 45, as by three wire rope clamps. The other end of the mooring line is attached to the frame arms 41 through swivels 49 mounted through the mooring line mounting holes 42, placing the mooring line slightly above the water. The shore anchor 47 preferably mounts the turnbuckle 45 about the same height above the water as the height of the mounting holes 42 in the support frame 21.

A guy line 25 is utilized in generally vertical alignment with each of the mooring lines 23. As were the mooring lines, the guy lines 25 are preferably also formed of wire rope. Each guy includes a turnbuckle 51 which is conveniently located between one end of the guy line and the aerator mounting plate 35. A clevis 53 connected to one end of the turnbuckle 51 is attached to the particular mounting plate clevis hole 37 which is in alignment above one of the mooring lines, and the other end of the turnbuckle 51 is suitably secured to one end of the guy lines 25, as by wire rope clamps. The other end of the guy line 25 is suitably secured to the vertically aligned mooring line, as by three wire rope clamps 54.

Each guy line 25 is attached to the associated mooring line 23 at a predetermined distance away from the flotation collar 19 thereby defining what is viewed as a triangle, as best seen in FIG. 1. The vertical portion of the aerator defines the altitude of the triangle. The mooring line 23 and the mounting arm 41 define its base, and the guy line 25 defines the third side or hypoteneuse as the triangle may be viewed as a right triangle. The angle "A" (FIG. 1) defined between the guy line 25 and the mooring line 23 is selected to provide optimum cooperation between the two lines. This angle should be from 5° to about 45°. Preferably, the angle is not greater than about 20°, and in the preferred embodiment shown, it is about 10°.

By interconnecting the guy lines 25 to the mooring lines 23 at the aforementioned angle A, the optimum component of a force acting upon any one line will be transmitted to the interconnected line. Further, a translation of any one mooring line 23 will be opposed by the remaining mooring lines, as a translation of a guy line 25 will effect the remaining guy lines. Thus, because of the interconnected relationship, a force acting upon any given line will be opposed by component forces generated by all the remaining stabilization lines. Depending upon the various factors involved with a particular floating aerator, the angle A is selected to create different resolution patterns between vertical and horizontal forces. For example, during the winter the icing problem might necessitate greater horizontal opposing force components than during the summer when the top of the aerator will not be burdened by ice. An angle A of about 10° has been found to be an effective alignment of the interconnecting lines for general use.

In one embodiment, ⅜ of an inch wire rope is used for the mooring lines 23, ¼ of an inch wire rope is used for the guy lines 25 and the turnbuckles 45, 51 are ⅜ of an inch size. With all of the lines 23 and 25 attached as described, the turnbuckles 45 are adjusted to have the mooring lines 23 define a catenary curve having about a 6 inch vertical drop in the middle of the line when the ends of the mooring lines are about the same height above the water level. The turnbuckles 51 of the guy lines 25 are then adjusted to have the guy lines generally taut. The motor of the aerator is then operated, and the behavior of the aerator noted. Should the top of the aerator gyrate, the guy lines 25 are tightened by means of the turnbuckles 51 which attach them to the top of the aerator. If the bottom or flotation collar of the aerator gyrates, the guy lines 25 are slightly slackened and the mooring lines 23 are tightened by means of their respective turnbuckles 45. If the aerator bobs up and down, the mooring lines 23 are slackened. By these easily accomplished adjustments, erratic movements of the aerator can be very quickly minimized as a result of cooperation between the interconnecting lines which operate to stabilize the floating aerator.

To provide the effective adjustment capability in the stabilization system, the turnbuckle 45 in each mooring line 23 should be positioned between the shore anchor 47 and the point of attachment of the guy line 25 to the mooring line 23. As earlier indicated, the turnbuckle 51 provided in each guy line 25 preferably is located adjacent the aerator mounting plate 35.

The present invention provides a stabilized floating aerator and allows, without danger of capsizing, the use of non-symmetrical aerator components and smaller and less buoyant flotation collars. Moreover the criticality of the float design is greatly reduced, allowing great latitude in design which is by no means limited to an annular float, such as shown, although there are advantages to such a float design. The aerator may safely be operated in the winter, for any ice collecting on the top portion of the aerator from the water spray will not disturb the effectiveness of the stabilization system. The stabilization system uses few and inexpensive components, yet is fully adjustable and is adaptable to various aerator configurations and operating environments.

While a particular embodiment of the invention has been shown and described, it should be apparent that various modifications may be made therein without departing from the scope of the invention.

Various of the features of the invention are set forth in the claims which follow.

What is claimed is:

1. A water aeration system comprising a floating aerator and means to stabilize said aerator, said floating aerator including a rotor having blades for movement in the water to be aerated, a motor for driving said rotor and a float disposed generally outboard of said rotor, said float supporting said motor above the water line; said stabilization means including a plurality of mooring lines, each having one end attached to said aerator generally adjacent said float and the other end fixed to a shore anchor and a plurality of inextensible guys, each of said guys having one end connected to an upper location upon said floating aerator, which location is positioned generally centrally thereof and serves to interconnect the upper ends of said plurality of guys, and the other end attached to one of said mooring lines at a predetermined distance from said aerator, said guys and said mooring lines cooperating to stabilize said floating aerator.

2. The aeration system of claim 1 wherein said aerator includes a guy mounting plate supported above said motor, said one end of said guys being connected to said guy mounting plate.

3. The aeration system of claim 2 wherein each of said guys and each of said mooring lines includes turnbuckle means.

4. The aeration system of claim 1 including at least three of said mooring lines and at least three of said guys.

5. The aeration system of claim 4 wherein said guys are in vertical alignment with said mooring lines.

6. The aeration system of claim 4 wherein said predetermined distance is selected to cause the angle defined between each of said guys and the mooring line to which it is attached to be between about 5° and about 45°.

7. The aeration system of claim 1 wherein the center of gravity of said floating aerator is above the water line and said rotor includes a plurality of blades mounted for horizontal rotation at a location at least partially submerged.

8. The aeration system of claim 7 wherein a vertical line passing through the center of gravity of said aerator is spaced apart from a vertical line passing through the geometric center of said aerator.

9. The aeration system of claim 1 wherein each of said mooring lines defines a catenary between said aerator and said shore anchor and each of said guy lines is substantially taut.

10. The aerator system of claim 1 wherein said float is annular in shape and concentric with the axis of rotation of said rotor.

11. A stabilization system for a floating aerator having its center of gravity located above the water line, which system comprises a plurality of mooring lines each having one end attached to a lower location on the aerator and each having its other end fixed to a remote anchor, and a plurality of inextensible guy lines each having one end connected to rigid plate means mounted at an upper location on the aerator and its other end attached to one of said mooring lines at a predetermined distance from the aerator.

12. The stabilization system of claim 11 wherein each of said guys includes turnbuckle means for tightening said guys to a taut condition and each of said mooring lines includes turnbuckle means at a location between said point of attachment to said anchor and said point of attachment of said guy line.

* * * * *